(12) United States Patent
Hsieh

(10) Patent No.: US 11,059,332 B2
(45) Date of Patent: Jul. 13, 2021

(54) FOLDABLE TIRE

(71) Applicant: INNOVA RUBBER CO., LTD., Changhua (TW)

(72) Inventor: Hsi-Ming Hsieh, Changhua (TW)

(73) Assignee: INNOVA RUBBER CO., LTD., Changhua (TW)

( * ) Notice: Subject to any disclaimer, the term of this patent is extended or adjusted under 35 U.S.C. 154(b) by 745 days.

(21) Appl. No.: 15/215,837

(22) Filed: Jul. 21, 2016

(65) Prior Publication Data

US 2017/0197476 A1 Jul. 13, 2017

(30) Foreign Application Priority Data

Jan. 8, 2016 (CN) .......................... 201620027324.9

(51) Int. Cl.
| | |
|---|---|
| *B60C 15/05* | (2006.01) |
| *B60C 15/04* | (2006.01) |
| *B60C 3/08* | (2006.01) |
| *B29D 30/48* | (2006.01) |

(52) U.S. Cl.
CPC ............... *B60C 15/05* (2013.01); *B60C 3/08* (2013.01); *B60C 15/04* (2013.01); *B29D 30/48* (2013.01); *B29D 2030/483* (2013.01); *B60C 2015/044* (2013.01); *B60C 2015/046* (2013.01); *B60C 2200/12* (2013.01); *Y10T 152/10009* (2015.01)

(58) Field of Classification Search
CPC .......... B60C 15/04; B60C 15/05; B60C 3/08; B60C 17/08; B60C 2015/044; B60C 2015/046; B60C 2200/12; B29D 30/48; B29D 2030/483; Y10T 152/10009

USPC ......... 152/152, 457, 522, 540, 545; 245/1.5; 156/136
See application file for complete search history.

(56) References Cited

U.S. PATENT DOCUMENTS

| | | | | | |
|---|---|---|---|---|---|
| 1,749,899 | A | * | 3/1930 | Alderfer | ................. B60C 15/04 |
| | | | | | 152/540 |
| 1,903,925 | A | * | 4/1933 | Johnson | ................. B60C 15/04 |
| | | | | | 245/1 |
| 2,014,359 | A | * | 9/1935 | Morrison | ............... B29D 30/48 |
| | | | | | 152/540 |

(Continued)

FOREIGN PATENT DOCUMENTS

| | | | | | |
|---|---|---|---|---|---|
| FR | 731.314 | A | * | 9/1932 | ............. B60C 15/04 |
| GB | 1 587 575 | A | * | 4/1981 | ............. B60C 15/04 |

(Continued)

OTHER PUBLICATIONS

Kirk-Othmer Encyclopedia of Chemical Technology, 4th ed., vol. 24, John Wiley & Sons, Inc., 1997, pp. 169-170.*
English machine translation of FR 731.314, Sep. 1, 1932.*

*Primary Examiner* — Adrienne C. Johnstone
(74) *Attorney, Agent, or Firm* — Muncy, Geissler, Olds & Lowe, P.C.

(57) ABSTRACT

A foldable tire includes a tire main body provided at two edges thereof with two tire beads respectively. A plurality of rings are disposed in each of the tire beads. Each of the rings has a reinforcing core, which includes a plurality of flexible steel filaments helically entwined with each other and has a diameter ranging from 0.2 millimeters to 0.5 millimeters, and a cladding layer clothing the reinforcing core, so that the reinforcing cores located in each of the tire beads are separated from each other.

4 Claims, 5 Drawing Sheets

(56) References Cited

U.S. PATENT DOCUMENTS

| | | | | |
|---|---|---|---|---|
| 2,031,720 | A | * | 2/1936 | Lee .......................... 156/136 X |
| 3,116,778 | A | * | 1/1964 | Herzegh ................... B60C 3/08 |
| 4,378,042 | A | * | 3/1983 | Inae ....................... B29D 30/48 |
| | | | | 152/540 |
| 7,406,991 | B2 | * | 8/2008 | Poling .................... B60C 15/04 |
| | | | | 152/540 X |
| 2005/0087278 | A1 | * | 4/2005 | Daghini .................. B60C 15/04 |
| 2006/0278316 | A1 | * | 12/2006 | Cheng .................... B60C 15/04 |
| | | | | 152/457 |
| 2006/0278317 | A1 | * | 12/2006 | Cheng ...................... B60C 3/08 |
| | | | | 152/457 |
| 2011/0168315 | A1 | | 7/2011 | Potin |
| 2014/0345777 | A1 | * | 11/2014 | Franke ................... B29D 30/48 |

FOREIGN PATENT DOCUMENTS

| | | |
|---|---|---|
| TW | M275113 U | 9/2005 |
| TW | M449723 U | 4/2013 |

\* cited by examiner

FOLDABLE TIRE

BACKGROUND OF THE INVENTION

1. Field of the Invention

The present invention relates generally to tires and more particularly, to a foldable tire.

2. Description of the Related Art

When external destruction happened to the tire body or the tire beads of the conventional foldable tire, water may permeate into the tire beads located at two edges of the tire body to cause the steel rings located in the tire beads damage resulted from rustiness, in the end causing the foldable tire to be abandoned because the tire beads are cracked. The aforesaid problem is resulted from that the conventional foldable tire is provided in each tire bead thereof with a thick steel ring or a bundle of thin steel rings. Either the thick steel ring or the bundle of thin steel rings is so low in flexibility as to make the tire uneasily folded. Besides, in the bundle of thin steel rings, the thin steel rings contact each other and is located in the same space; therefore, once there exists water in the space, all the thin steel rings will be damaged by rustiness and even cause the foldable tire to be abandoned.

Referring to Taiwan Patent No. M449723, in the figures thereof the tires having the tire bead provided therein with a bundle of two to seven steel rings are disclosed. Referring to Taiwan Patent No. M275113, in the figures thereof the tires having the tire bead provided therein with a bundle of two to five steel rings are disclosed. Referring to US Patent Publication No. US2011/0168315, in the figures thereof the tire having the tire bead provided therein with a bundle of four steel rings is disclosed. In the aforementioned patents, although each steel ring is raised in flexibility by being composed of a plurality of steel filaments, the structure that a plurality of steel rings are bound up to become a bundle is still low in flexibility. Besides, the steel rings are uneasy to be fixed with each other, so it causes the tire manufacturing process inconvenience to make the steel rings become a bundle in practice.

SUMMARY OF THE INVENTION

The present invention has been accomplished in view of the above-noted circumstances. It is an objective of the present invention to provide a foldable tire which is high in flexibility, long in life of time, and convenient in manufacturing.

To attain the above objective, the present invention provides a foldable tire including a tire main body provided at two edges thereof with two tire beads respectively. A plurality of rings are disposed in each of the tire beads. Each of the rings has a reinforcing core, which includes a plurality of flexible steel filaments helically entwined with each other, and has a diameter ranging from 0.2 millimeters to 0.5 millimeters, and a cladding layer clothing the reinforcing core, so that the reinforcing cores located in each of the tire beads are separated from each other.

Because the reinforcing cores located in the same tire bead are not in contact with each other, the foldable tire of the present invention is so high in flexibility as to be easily folded. Besides, once the tire main body is damaged to let water permeate into the tire bead, water will not spread to all the reinforcing cores located in the tire bead; therefore, not all the reinforcing cores but only parts of the reinforcing cores may be damaged, so that the foldable tire of the present invention has relatively longer life of time. Furthermore, because of the cladding layers of the rings, the reinforcing cores located in the same tire bead are kept without contact with each other; therefore, it is convenient to separate the reinforcing cores from each other in the tire manufacturing process.

Preferably, the cladding layers of the rings located in each of the tire beads may contact with and adhere to each other, so that the rings located in the same tire bead are fixed with each other to become a bundle, which causes convenience to the tire manufacturing process. The cladding layers of the rings may be made of the material enabling the cladding layers to adhere to each other, such as rubber. The cladding layers of the rings and the tire beads may be even all made of same rubber material, so that the rings in the same tire bead can be easily fixed with each other to become a bundle in a way that the vulcanization process makes the cladding layers of the rings adhere to each other, and the rings can be combined with the tire bead more firmly.

Preferably, the flexible steel filaments of the reinforcing core of each of the rings may be helically entwined with a reinforcing wire.

Preferably, a rope may be coiled into the rings located in each of the tire beads.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
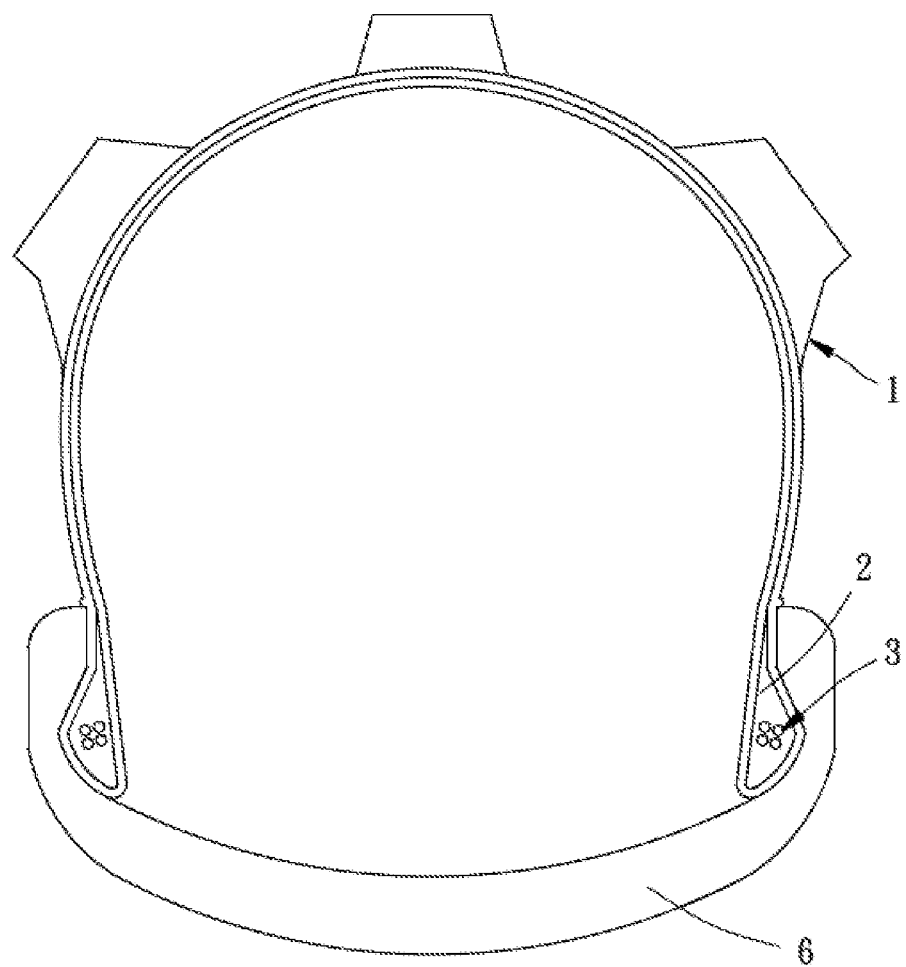
FIG. 1 is a schematic sectional view of a wheel rim and a foldable tire according to a first preferred embodiment of the present invention.
Figure 2:
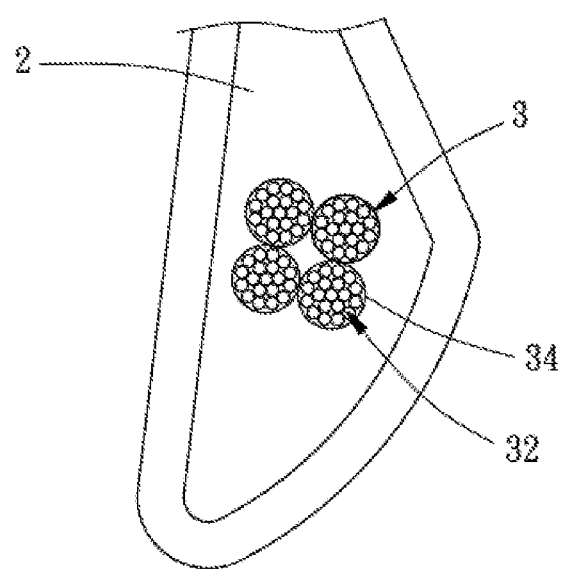
FIG. 2 is a schematic sectional view of a tire bead of the foldable tire according to the first preferred embodiment of the present invention.
Figure 3:
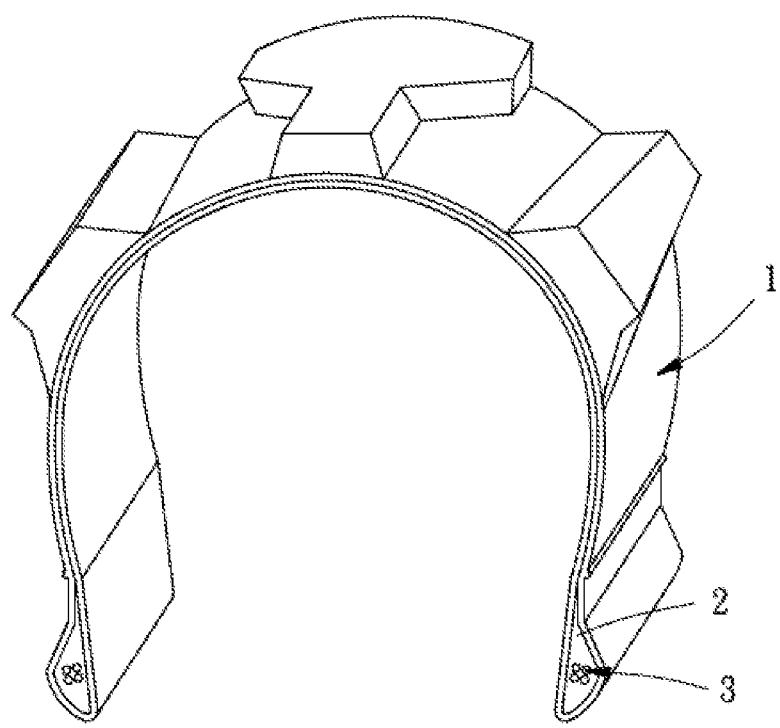
FIG. 3 is a sectional perspective view of the foldable tire according to the first preferred embodiment of the present invention.

Referring to FIGS. 1-3, a foldable tire according to a first preferred embodiment of the present invention includes a tire main body 1 which is provided at two edges thereof with two tire beads 2. There are four (or maybe three) rings 3 disposed in each of the tire beads 2. Each of the rings 3 is shaped as a circle centering around the center of the tire. Each of the rings 3 may be formed in a way that a rope is coiled into a loop centering around the center of the tire, such that the rings 3 are formed by four (or maybe three) individual loops. Alternately, a rope may be directly coiled into four (or maybe three) loops centering around the center of the tire to become the four (or maybe three) rings 3 located in the same tire bead 2.

Figure 4:
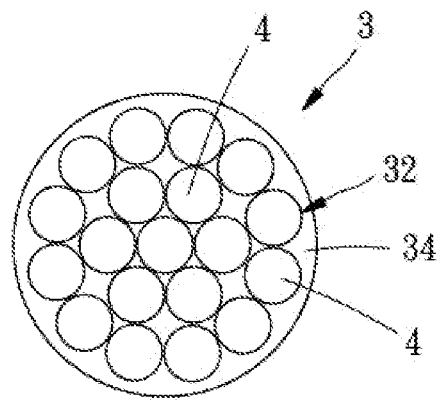
FIG. 4 is a schematic sectional view of a ring of the foldable tire according to the first preferred embodiment of the present invention.
Figure 5:
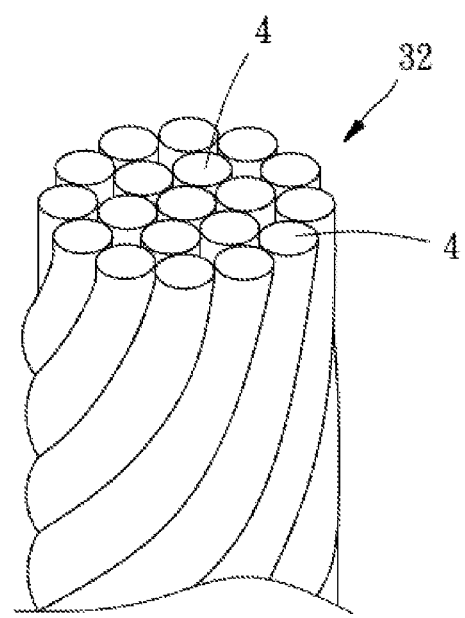
FIG. 5 is a schematic perspective view of a reinforcing core of the ring of the foldable tire according to the first preferred embodiment of the present invention.

As shown in FIG. 2, the rings 3 located in the same tire bead 2 are concentrated into a bundle irregularly, but may be concentrated into a bundle regularly, and entirely clad in the tire bead 2. Each of the rings 3 has a reinforcing core 32 and a cladding layer 34. As shown in FIGS. 4-5, the reinforcing core 32 includes a plurality of flexible steel filaments 4 helically entwined with each other. The reinforcing core 32 usually includes two to thirty flexible steel filaments 4. In this embodiment, the reinforcing core 32 includes nineteen flexible steel filaments 4, as shown in FIGS. 4-5.

Figure 6:
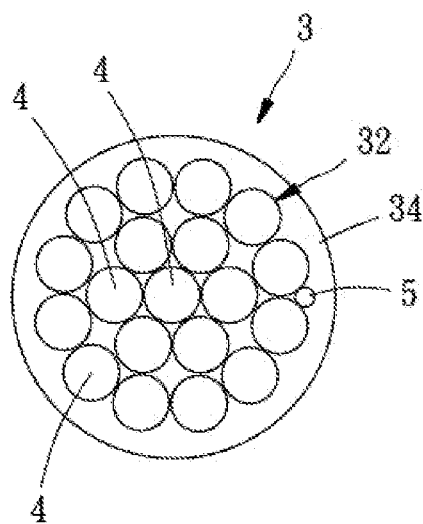
FIG. 6 is a schematic sectional view of a ring of a foldable tire according to a second preferred embodiment of the present invention.
Figure 7:
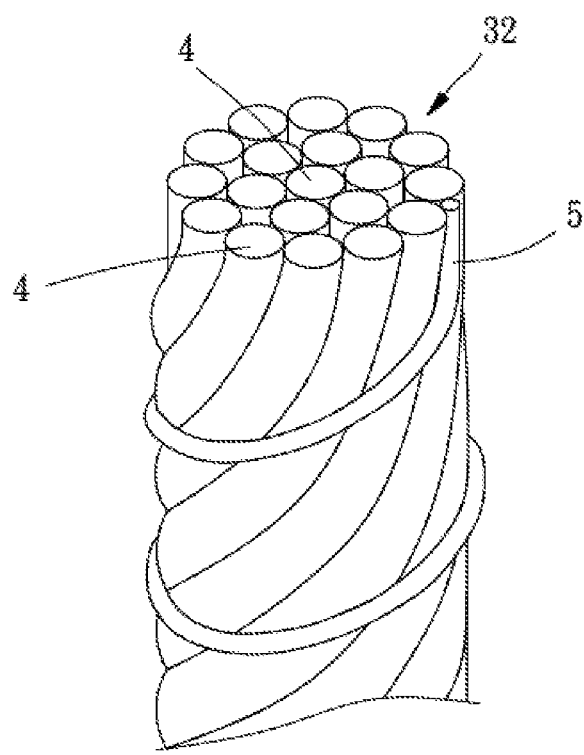
FIG. 7 is a schematic perspective view of a reinforcing core of the ring of the foldable tire according to the second preferred embodiment of the present invention.

In each of the rings 3, there may, but not limited to, be a reinforcing wire 5 helically entwined with the flexible steel filaments 4 of the reinforcing core 32 for reinforcing the combination among the flexible steel filaments 4, such as that in a second preferred embodiment of the present invention as shown in FIGS. 6-7. The reinforcing wire 5 may be cotton yarn, flexible steel filament, and so on. In the second preferred embodiment, the reinforcing wire 5 is disposed at the outside of the bundle of the flexible steel filaments 4 to tighten up the flexible steel filaments 4.

The reinforcing core 32 of each of the rings 3, which is composed of flexible steel filaments 4 helically entwined with each other and, has a diameter ranging from 0.2 millimeters to 0.5 millimeters, is so firm in structure as to keep the tire beads 2 ring-shaped, thereby enabling the tire beads 2 to sustain the pressure from the gas inside the tire main body 1 and be tightly fixed in a wheel rim 6.

For each of the rings 3, the reinforcing core 32 is clad in the cladding layer 34, so that the reinforcing cores 32 located in each of the tire beads 2 are separated from each other, which means the reinforcing cores 32 located in the same tire bead 2 are not in contact with each other, as shown in FIG. 1 and FIG. 3. Such structure of the rings 3 brings the foldable tire of the present invention relatively higher flexibility, so that the foldable tire can be easily folded to become relatively smaller, thereby convenient in storage and transportation. Besides, once the tire main body 1 is damaged to let water permeate into the tire bead 2, water will not spread to all the reinforcing cores 32 located in the tire bead 2. Therefore, not all the reinforcing cores 32 but only parts of the reinforcing cores 32 may be in contact with water, so that the foldable tire of the present invention has relatively longer life of time.

Because the cladding layers 34 of the rings 3 ensure the reinforcing cores 32 located in the same tire bead 2 being not in contact with each other, it is convenient to separate the reinforcing cores 32 from each other in the tire manufacturing process. Besides, as shown in FIG. 2, the cladding layers 34 of the rings 3 located in the same tire bead 2 may contact with and adhere to each other to make the rings 3 fixed with each other to become a bundle, which causes convenience to the tire manufacturing process. The cladding layers 34 of the rings 3 may be made of the material enabling the cladding layers 34 to adhere to each other, such as rubber. The cladding layers 34 of the rings 3 and the tire beads 2 may be even all made of same rubber material, so that the rings 3 in the same tire bead 2 can be easily fixed with each other to become a bundle in a way that the vulcanization process makes the cladding layers 34 of the rings 3 adhere to each other, and the rings 3 can be combined with the tire bead 2 relatively more firmly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A foldable tire comprising:
    a tire main body provided with a tire bead at each of two edges thereof; and
    a single rope disposed in each of the tire beads, each said rope consisting of either three or four circumferential windings, each said rope having a reinforcing core, which comprises a plurality of steel filaments helically entwined with each other, and a cladding layer sheathing the reinforcing core in a way that each of the windings of each of the ropes comprises a section of the reinforcing core and a section of the cladding layer, and the sections of the reinforcing core of the windings of each of the ropes are separated from each other;
    wherein the number of steel filaments in the plurality of steel filaments is between 20 and 30;
    wherein the reinforcing core has a diameter ranging from 0.2 millimeters to 0.5 millimeters; and
    wherein in each of the tire beads the sections of the cladding layer of the windings of the rope contact with and adhere to each other.

2. The tire as claimed in claim 1, wherein the cladding layers of the ropes are made of rubber.

3. The tire as claimed in claim 1, wherein the tire beads and the cladding layers of the ropes are made of same rubber material.

4. The tire as claimed in claim 1, wherein the steel filaments of the reinforcing core of each of the ropes are helically entwined with a reinforcing wire.

* * * * *